(12) United States Patent
Inoue et al.

(10) Patent No.: US 7,260,223 B2
(45) Date of Patent: Aug. 21, 2007

(54) DATA TRANSFER SYSTEM

(75) Inventors: Akihiko Inoue, Fukuoka (JP); Koji Kai, Fukuoka (JP); Masayoshi Toujima, Fukuoka (JP); Takashi Hashimoto, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 815 days.

(21) Appl. No.: 10/327,956

(22) Filed: Dec. 26, 2002

(65) Prior Publication Data

US 2003/0125015 A1    Jul. 3, 2003

(30) Foreign Application Priority Data

Dec. 27, 2001   (JP) ............................ 2001-396429

(51) Int. Cl.
   *H04L 9/00*         (2006.01)
(52) U.S. Cl. .................. 380/268; 380/270; 375/295; 455/411; 455/517
(58) Field of Classification Search ............... 380/270, 380/268; 375/295; 455/411, 517
   See application file for complete search history.

(56) References Cited

U.S. PATENT DOCUMENTS

| | | | | |
|---|---|---|---|---|
| 4,888,799 A | * | 12/1989 | Mobley et al. | 380/275 |
| 5,535,277 A | * | 7/1996 | Shibata et al. | 380/28 |
| 6,236,686 B1 | * | 5/2001 | Kamishima | 375/295 |
| 6,661,469 B1 | * | 12/2003 | Kawabata et al. | 348/607 |
| 6,996,096 B2 | * | 2/2006 | Niida et al. | 370/360 |
| 7,130,426 B1 | * | 10/2006 | Cha et al. | 380/201 |

FOREIGN PATENT DOCUMENTS

| | | |
|---|---|---|
| EP | 0 676 876 A1 | 4/1995 |
| EP | 0 978 965 A1 | 2/2000 |
| EP | 1 143 658 A1 | 10/2001 |
| EP | 1324530 A2 * | 2/2003 |
| GB | 1 499 974 | 2/1978 |
| JP | 08-32574 | 2/1996 |

OTHER PUBLICATIONS

Mircea R. Stan et al., "Bus-Invert Coding for Low-Power I/O", IEEE Transactions on Very Large Scale Integration (VLSI) Systems, vol. 3, No. 1, pp. 49-58, Mar. 1995.
Bruce Schneier, "Applied Cryptography second Edition", 1996, John Wiley & Sons, USA XP002251588, p. 237.

* cited by examiner

*Primary Examiner*—Kambiz Zand
*Assistant Examiner*—Tongoc Tran
(74) *Attorney, Agent, or Firm*—McDermott Will & Emery LLP

(57) ABSTRACT

In a data-sending device, a data generation section provides input data itself or a bit-inverted version of the input data as intermediate data and generates an inversion signal that indicates whether or not the intermediate data is the bit-inverted version of the input data. An encrypting section generates scrambled data by inserting the inversion signal in the intermediate data at a bit position. A data-receiving device removes the inversion signal from the scrambled data, and restores the input data based on the inversion signal.

5 Claims, 7 Drawing Sheets

| | | SI | |
|---|---|---|---|
| | | 0 | 1 |
| DT1 [i] | 0 | 0 | 1 |
| | 1 | 1 | 0 |

DATA TRANSFER SYSTEM

BACKGROUND OF THE INVENTION

The present invention relates to a technique for providing enhanced security for communication data in a data transfer system.

In recent years, portable devices such as mobile phones are used with highly confidential data such as a credit card number. Since a portable device is often carried around with the user, it is quite possible that the device may be lost and come into possession of a third person. With mobile phones, users frequently buy new handsets to replace old ones, and the used handsets are either collected or disposed of If confidential data is left undeleted in a collected or disposed handset, there is a high risk that the confidential data may be obtained by a third person. Therefore, security techniques for portable devices are becoming more and more important.

On the other hand, portable devices are powered by batteries, and it is therefore important that they consume as little power as possible. Each year, the amount of power consumed by a system for use in a portable device has been reduced, and various techniques have been proposed in the art. For example, "Bus-Invert Coding for Low Power I/O" (IEEE Transaction on VLSI Systems, Vol. 3, No. 1, 1995) discloses a method for reducing the amount of power consumed in a data transfer path between semiconductor devices. According to this method, if there are more mismatched bits, than matched bits, between data transferred at time T and data transferred at time T+1, the data transferred at T+1 is bit-inverted before being transferred. In this way, the number of switching transitions occurring on an I/O pad is reduced, and the power consumption can be reduced.

Problems to be Solved by the Invention

However, the above conventional method is for reducing the power consumption, and does not deal with security problems. FIG. 9 is a conceptual diagram illustrating a configuration of a data transfer system employing the conventional method. Referring to FIG. 9, a signal line 51 carries the transferred data, and a signal line 52 carries a 1-bit signal that indicates whether or not the transferred data has been inverted. If the signal lines 51 and 52 can be probed from outside, the transferred data can easily be observed.

As a technique for providing enhanced security for data transfer between devices, Japanese Laid-Open Patent Publication No. 08-32574 discloses a method for realizing enhanced security for data in a synchronous serial data transfer device. According to this method, the sync signal is encrypted in addition to encrypting the transferred data, thereby improving the security of the data at a relatively low cost.

However, it is assumed that the method is used with serial data transfer, and the use of the method with parallel data transfer will cause an increase in the circuit area. While there are other coding methods for parallel communications that use complicated encryption schemes, those methods require a separate encryption circuit. Moreover, since such an encryption circuit itself consumes some power, it is difficult to reduce the cost and the power consumption.

SUMMARY OF THE INVENTION

An object of the present invention is to realize both an enhanced security level and a reduction in the power consumption at a low cost in a data transfer system for transferring data between a data-sending device and a data-receiving device.

Specifically, the present invention provides a data transfer system for transferring data between a data-sending device and a data-receiving device, wherein: the data-sending device includes: a data generation section for receiving input data so as to provide the input data itself or a bit-inverted version of the input data as intermediate data and generate an inversion signal that indicates whether or not the intermediate data is the bit-inverted version of the input data; and an encrypting section for receiving the intermediate data and the inversion signal so as to generate scrambled data by inserting the inversion signal in the intermediate data at a bit position; the data-sending device sends the scrambled data; and the data-receiving device includes a restoring section for obtaining the intermediate data by removing the inversion signal from the scrambled data so as to restore the input data based on the intermediate data and the inversion signal.

According to the present invention, the inversion signal is inserted in the intermediate data at a bit position before the data is transferred. Therefore, it is not readily apparent from outside which one of the bit lines used in the data transfer is carrying the inversion signal, thereby enhancing the security level as compared with that in the prior art. Moreover, since a complicated encryption circuit is not required, the encryption of the data transfer path is realized at a low cost.

In the data transfer system of the present invention, it is preferred that: the encrypting section of the data-sending device includes a first pseudo-random number generator so that the bit position at which the inversion signal is to be inserted is determined according to the random number sequence generated by the first pseudo-random number generator; and the restoring section of the data-receiving device includes a second pseudo-random number generator capable of generating the same random number sequence as that generated by the first pseudo-random number generator so that a bit position from which the inversion signal is to be removed is determined according to the random number sequence generated by the second pseudo-random number generator.

Moreover, in the data transfer system of the present invention, it is preferred that: the encrypting section of the data-sending device changes the bit position at which the inversion signal is to be inserted during a series of data transfer operations; and the restoring section of the data-receiving device changes a bit position from which the inversion signal is to be removed in synchronism with the encrypting section changing the bit position at which the inversion signal is to be inserted. Thus, the position at which the inversion signal is to be inserted is changed during a series of data transfer operations, thereby making it more difficult to decrypt the transferred signal from outside and thus further enhancing the security level.

Moreover, in the data transfer system of the present invention, it is preferred that the data generation section of the data-sending device obtains a Hamming distance between the received input data and intermediate data, which is to be transferred a time slot before the input data, so as to determine whether or not the input data is to be bit-inverted based on the Hamming distance. Thus, by the use of the Hamming distance, the number of bits of current data that are inverted from the previous data is reduced, thereby realizing a low power consumption.

Moreover, in the data transfer system of the present invention, it is preferred that: the encrypting section of the data-sending device shuffles bit positions of the intermediate data when generating the scrambled data; and the restoring section of the data-receiving device obtains the intermediate data from the scrambled data by removing the inversion signal and de-shuffling the bit positions. Thus, the bit positions of the transferred data are shuffled in addition to the insertion of the inversion signal, thereby making it more difficult to decrypt the transferred signal from outside and thus further enhancing the security level.

DETAILED DESCRIPTION OF THE INVENTION

Embodiments of the present invention will now be described with reference to the drawings.

First Embodiment

Figure 1:
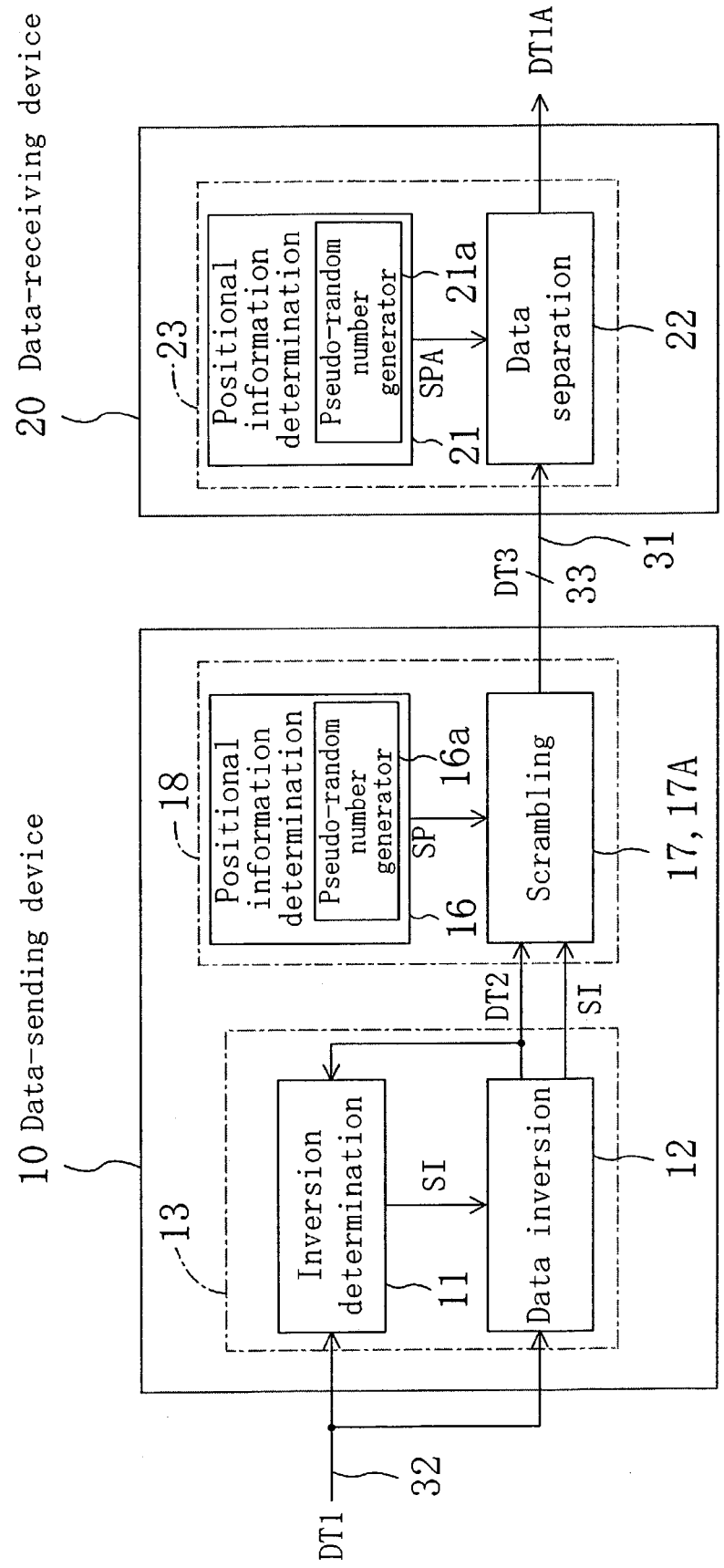
FIG. 1 is a block diagram illustrating a configuration of a data transfer system according to the first embodiment of the present invention.

FIG. 1 is a block diagram illustrating a configuration of a data transfer system according to the first embodiment of the present invention. The data transfer system of FIG. 1 includes a data-sending device 10 and a data-receiving device 20. Data is transferred from the data-sending device 10 to the data-receiving device 20 via a signal line 31. It is assumed in the present embodiment that 32-bit parallel data is transferred.

The data-sending device 10 includes an inversion determination section 11, a data inversion section 12, a first positional information determination section 16 and a scrambling section 17. The inversion determination section 11 and the data inversion section 12 together form a data generation section 13, while the first positional information determination section 16 and the scrambling section 17 together form an encrypting section 18. On the other hand, the data-receiving device 20 includes a restoring section 23, which includes a second positional information determination section 21 and a data separation section 22.

In the data-sending device 10, the data generation section 13 receives input data DT1 via a signal line 32, and provides the input data DT1 itself, or a bit-inverted version thereof, as intermediate data DT2. The data generation section 13 also provides an inversion signal SI that indicates whether or not the intermediate data DT2 is a bit-inverted version of the input data DT1. It is herein assumed that the inversion signal SI is a 1-bit signal for the sake of simplicity.

Then, the encrypting section 18 receives the intermediate data DT2 and the inversion signal SI, and inserts the inversion signal SI at a certain bit position in the intermediate data DT2, thereby generating scrambled data DT3. The scrambled data DT3 generated by the encrypting section 18 is transferred to the data-receiving device 20 via the 33-bit signal line 31. In this way, the inversion signal SI is concealed from outside.

In the data-receiving device 20, the restoring section 23 obtains intermediate data DT2A by removing the inversion signal SI from the scrambled data DT3 received via the signal line 31. Then, input data DT1A is restored based on the intermediate data DT2A and the inversion signal SI.

Figure 2A:
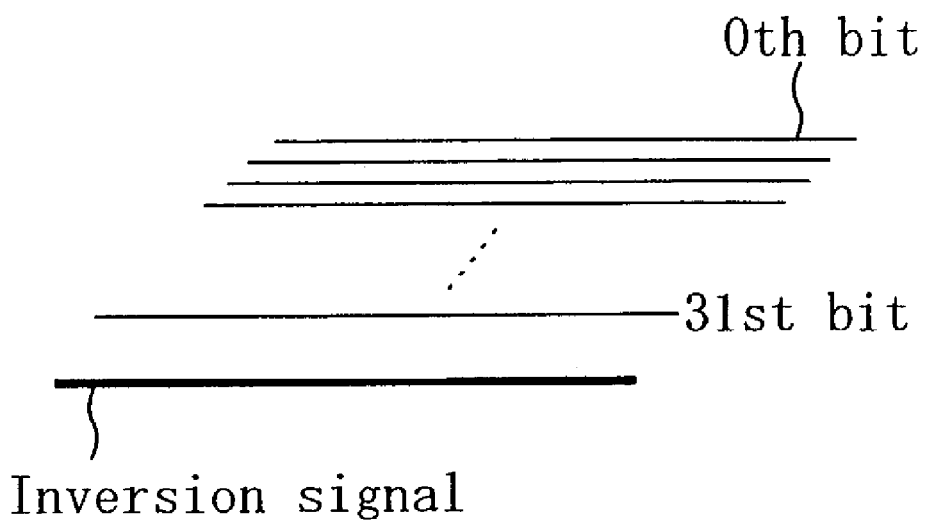
FIG. 2A and FIG. 2B are conceptual diagrams illustrating a characteristic of a data transfer operation with the configuration of FIG. 1.
Figure 2B:
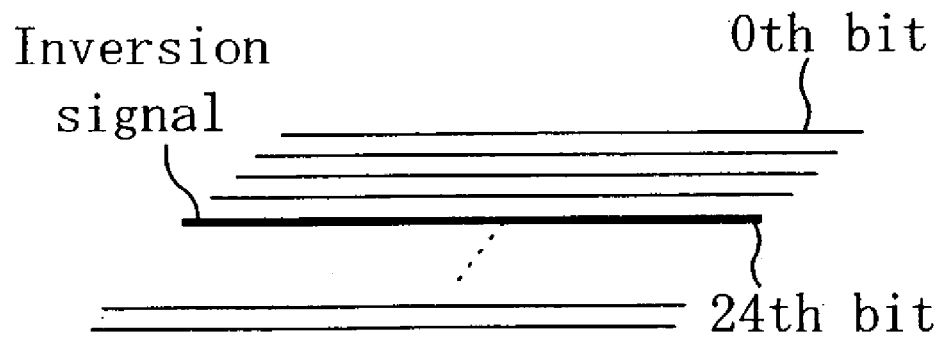

FIG. 2A and FIG. 2B are conceptual diagrams illustrating a characteristic of the data transfer operation of the present embodiment, where it is assumed that a 32-bit bus is used. FIG. 2A illustrates a conventional coding scheme, and FIG. 2B illustrates the coding scheme of the present embodiment. With the conventional coding scheme, the inversion signal is transferred separately from the transferred data, as illustrated in FIG. 2A. Therefore, it is easy to determine whether the transferred data has been bit-inverted by detecting the inversion signal from outside. In contrast, according to the present embodiment, the inversion signal is concealed from outside by being hid in the bit string of the transferred data, as illustrated in FIG. 2B. In this way, the security level is enhanced as compared to that with the conventional coding scheme.

Note however that if the inversion signal is inserted at a fixed position, the inversion signal can be revealed with a probability of 1/33. Since the number of positions at which the inversion signal can be inserted is limited, and one can easily search through all such positions, it is not very difficult to reveal the inversion signal from outside if the position of the inversion signal is fixed.

Therefore, according to the present embodiment, the position at which the inversion signal is inserted is changed during a series of data transfer operations so as to further enhance the security level.

The operation and detailed configuration of the data transfer system of the present embodiment will now be described.

Data to be transferred at time T (input data) DT1 is input to the data-sending device 10 via the signal line 32. The inversion determination section 11 receives the input data DT1, and also receives data DT2 to be transferred at time T-1 (hereinafter referred to as "previously-transferred data") from the data inversion section 12, so as to generate the inversion signal SI based on the input data DT1 and the previously-transferred data DT2. The generated inversion signal SI is output to the data inversion section 12. Note that previously-transferred data may alternatively be stored in a register provided in the inversion determination section 11.

Specifically, the inversion signal SI can be generated as follows. First, the Hamming distance between the input data DT1 and the previously-transferred data DT2 is obtained. The term "Hamming distance" refers to the number of elements that satisfy ai≠bi for a pair of code words of the same code length: a=(a1, a2, . . . , an) and b=(b1, b2, . . . , bn). For example, the Hamming distance between a pair of 3-bit signals (1, 0, 1) and (0, 1, 1) is "2".

Then, if the obtained Hamming distance is greater than a predetermined inversion rate, the inversion determination section 11 outputs "1" as the inversion signal SI so as to instruct the data inversion section 12 to perform a bit inversion operation. Otherwise, the inversion determination section 11 outputs "0" as the inversion signal SI so as to instruct the data inversion section 12 not to perform a bit inversion operation. Note that in many cases, the inversion rate is set to be one half of the bit width of the transferred data in order to reduce the power consumption. With the transferred data being 32-bit data, assume that the inversion rate is 16 bits. Then, the inversion determination section 11 outputs "1" when the Hamming distance is greater than 16 bits, and "0" when the Hamming distance is less than or equal to 16 bits. Note that the inversion rate may be changed during a series of data transfer operations, or may be changed after completion of each series of data transfer operations.

Figure 3:
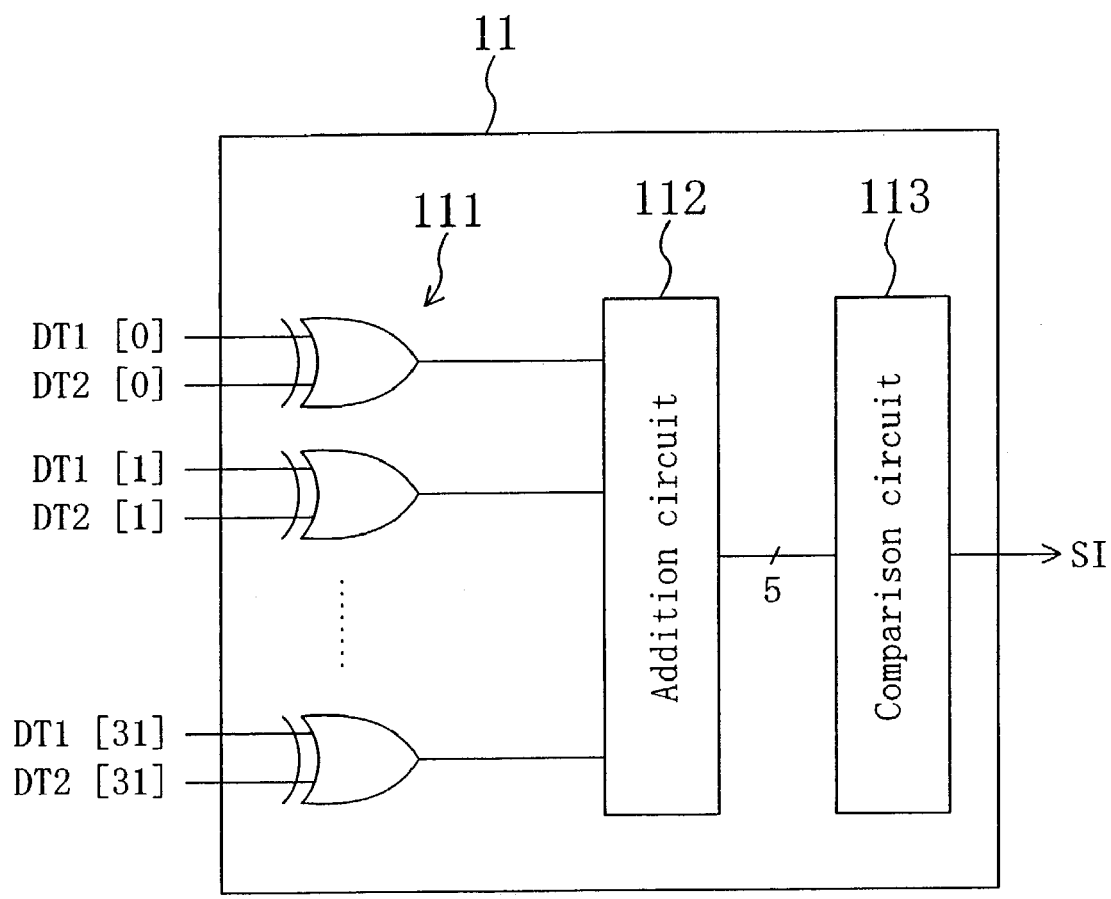
FIG. 3 is a diagram illustrating a configuration of an inversion determination section in a data-sending device of FIG. 1.

FIG. 3 illustrates an internal configuration of the inversion determination section 11. As illustrated in FIG. 3, the inversion determination section 11 includes a number of XOR gates 111 that corresponds to the bit width of the transferred data, an addition circuit 112 and a comparison circuit 113. Each XOR gate 111 receives a bit of the input data DT1 and the corresponding bit of the previously-transferred data DT2. Thus, the XOR gate 111 outputs "1" when the bit of the input data DT 1 and that of the previously-transferred data DT2 are of inverted values, and "0" when they are of the same value. The outputs of the XOR gates 111 are added together at the addition circuit 112, thereby obtaining the Hamming distance. The comparison circuit 113 compares the Hamming distance output from the addition circuit 112 with the predetermined inversion rate, and outputs the comparison result as the inversion signal SI.

The data inversion section 12 receives the input data DT1 and the inversion signal SI. When the inversion signal SI is "1", the data inversion section 12 inverts the input data DT1 and outputs the inverted data as the intermediate data DT2. When the inversion signal SI is "0", the data inversion section 12 outputs the input data DT1 as the intermediate data DT2, without inverting the input data DT1. The data inversion section 12 also outputs the inversion signal SI.

Figures 4, 5:
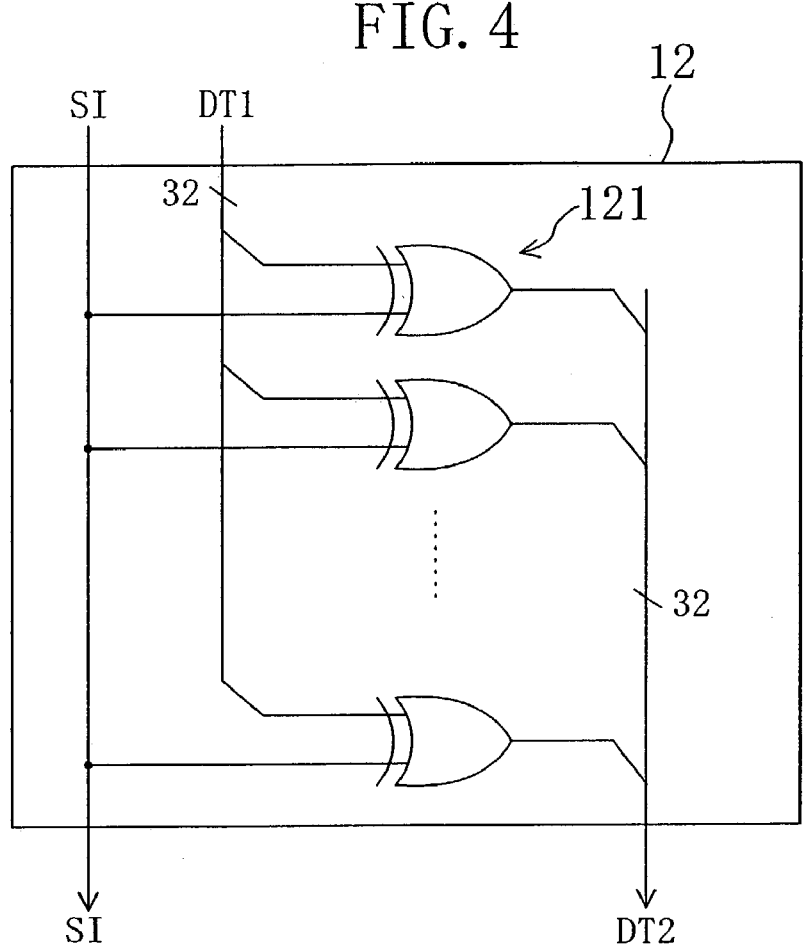
FIG. 4 is a diagram illustrating a configuration of a bit inversion section in the data-sending device of FIG. 1.
FIG. 5 is a truth table illustrating an operation of an XOR gate in the bit inversion section.

FIG. 4 illustrates an internal configuration of the data inversion section 12. As illustrated in FIG. 4, the data inversion section 12 includes a number of XOR gates 121 that corresponds to the bit width of the transferred data. Each XOR gate 121 receives a bit of the input data DT1 and the inversion signal SI. FIG. 5 is a truth table illustrating an operation of each XOR gate 121. As can be seen from FIG. 5, all bits of the input data DT1 are inverted when the inversion signal SI is "1", and they are not inverted when the inversion signal SI is "0". Thus, a bit inversion operation based on the inversion signal SI is realized by using the exclusive OR operation.

Then, in the encrypting section 18, the first positional information determination section 16 determines the position at which the inversion signal SI is inserted in the intermediate data DT2. Herein, a first pseudo-random number generation circuit 16a is used for generating positional information SP. Algorithms for generating a random number sequence include a middle square method, a mixed congruential method, an M-sequence method, etc. Moreover, the present invention is not limited to any particular type of random number sequence, and the random number sequence used in the present invention may be those of a normal distribution, an exponential distribution, a Poisson distribution, a binominal distribution, etc. By using the pseudo-random number generation circuit 16a for generating the positional information SP, it is possible to dynamically change the position at which the inversion signal SI is inserted.

The scrambling section 17 receives the intermediate data DT2 and the inversion signal SI from the data inversion section 12, and also receives the positional information SP from the first positional information determination section 16. Then, the scrambling section 17 inserts the inversion signal SI in the intermediate data DT2 at a position that is designated by the positional information SP.

Figure 6:
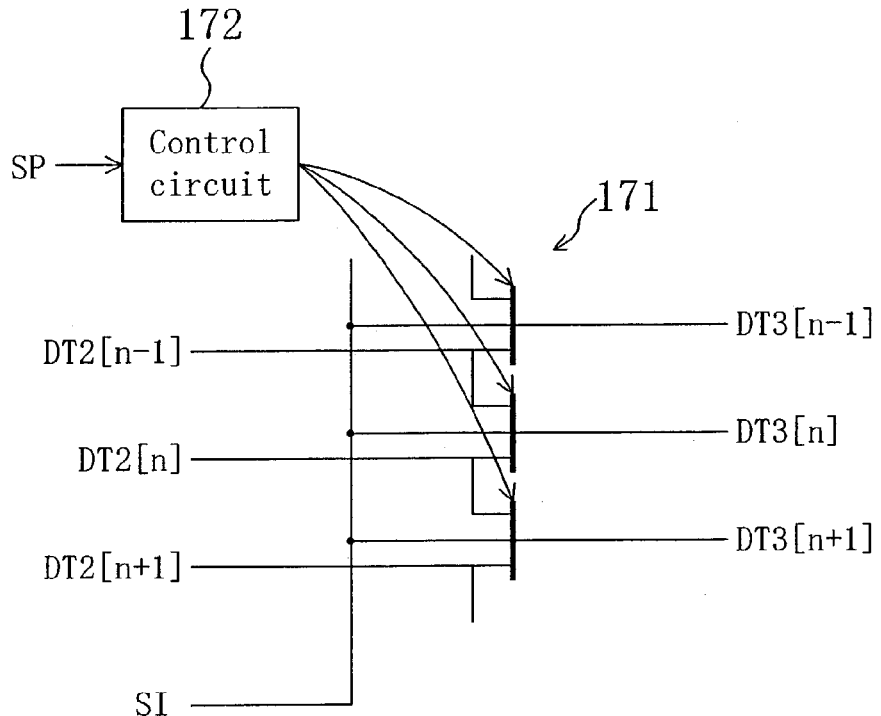
FIG. 6 is a diagram illustrating a configuration of a scrambling section in the data-sending device of FIG. 1.

FIG. 6 illustrates an internal configuration of the scrambling section 17. As illustrated in FIG. 6, the scrambling section 17 includes a number of selectors 171, and a control circuit 172 for controlling the operation of each selector 171 based on the positional information SP. The number of selectors 171 is the bit width of the input data plus one (only three selectors 171 are shown in FIG. 6 for the sake of simplicity). Each selector 171 receives two adjacent bits of the intermediate data DT2 and the inversion signal SI, and selectively outputs one of these three inputs as a bit value of the scrambled data DT3.

Specifically, DT2 [n] (the value of the nth bit of the intermediate data DT2) is output as DT3 [n] (the value of the n-th bit of the scrambled data DT3) or DT3 [n+1]. When the inversion signal SI is inserted between the $(n-1)^{th}$ bit and the $n^{th}$ bit of the intermediate data DT2, i.e., when the inversion signal SI is output as the $n^{th}$ bit of the scrambled data DT3, the control circuit 172 controls the operation of the selectors 171 so that DT2 [l] (l<n) is output as DT3 [l], DT2 [m] (m≧n) as DT3 [m+1] and the inversion signal SI as DT3 [n].

On the other hand, in the data-receiving device 20, the second positional information determination section 21 includes a second pseudo-random number generation circuit 21a. The second pseudo-random number generation circuit 21a generates the same random number sequence as that generated by the first pseudo-random number generation circuit 16a of the first positional information determination section 16 in the data-sending device 10. The second positional information determination section 21 generates positional information SPA, indicating the position at which the inversion signal SI has been inserted, based on the random number generated by the second pseudo-random number generation circuit 21a. In this way, the data-receiving device 20 can reliably know the position at which the inversion signal SI has been inserted in the data-sending device 10.

There are various ways to generate the same random number sequence from different random number generation circuits. For example, one of the simplest ways is to sequentially generate integers from 0 to 31. Another simple way is to use the same random number generator function with the same initial value.

The data separation section 22 receives the scrambled data DT3 via the signal line 31 and the positional information SPA from the second positional information determination section 21 so as to separate the inversion signal SI from the scrambled data DT3.

Figure 7:
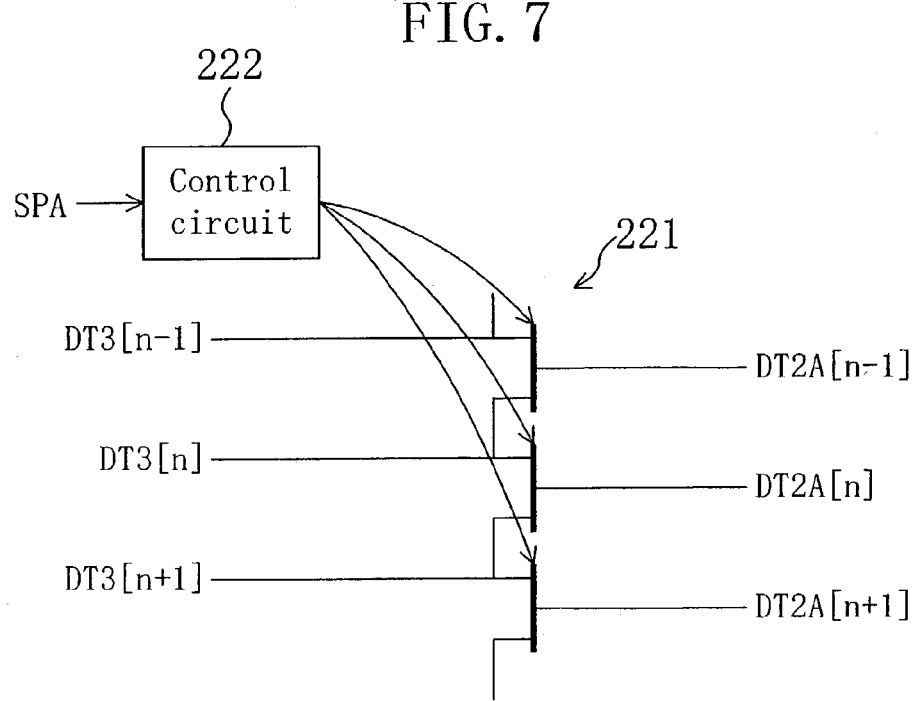
FIG. 7 is a diagram illustrating a configuration of a separation section in the data-sending device of FIG. 1.

FIG. 7 illustrates an important part of an internal configuration of the data separation section 22. As illustrated in FIG. 7, the data separation section 22 includes a number of selectors 221 that corresponds to the bit width of the input data (only three selectors 221 are shown in FIG. 7 for the sake of simplicity), and a control circuit 222 for controlling the operation of each selector 221 based on the positional information SPA. Each selector 221 receives two adjacent bits of the scrambled data DT3, and selectively outputs one of these two inputs as a bit value of the restored intermediate data DT2A.

Specifically, DT3 [n] (the value of the $n^{th}$ bit of the scrambled data DT3) is output as DT2A [n−1 ] (the value of the $(n-1)^{th}$ bit of the restored intermediate data DT2A) or DT2A [n]. When the position at which the inversion signal SI is inserted is the $n^{th}$ bit of the scrambled data DT3, i.e., when the inversion signal SI is inserted between the $(n-1)^{th}$ bit and the $n^{th}$ bit of the intermediate data DT2, the control circuit 222 controls the operation of the selectors 221 so that DT3 [l] (l<n) is output as DT2A [l] and DT3 [m] (m>n) as DT2A [m−1].

Although not shown, DT3 [n] is separated as the inversion signal SI. Then, the restored intermediate data DT2A is output as the restored input data DT1A after it is bit-inverted if the inversion signal SI is "1" or without being bit-inverted if the inversion signal SI is "0".

In this way, it is possible to suppress the number of bus switching transitions occurring in the data transfer path, thereby reducing the power consumption. Moreover, since the inversion signal cannot be observed from outside, the data can be secured even if the data path is probed. Therefore, according to the present embodiment, it is possible to provide both an enhanced security level and a reduction in the power consumption by using a circuit of a relatively small scale without requiring a complicated encryption circuit.

Moreover, the position at which the inversion signal SI is inserted can be changed during a series of data transfer operations, thereby making it more difficult to decrypt the transferred data from outside, and thus enhancing the security level. Note that the timing to change the position at which the inversion signal is inserted can be determined beforehand between the data-sending device and the data-receiving device. Alternatively, a separate signal that indicates a change in the insertion position may be sent.

Note that the position at which the inversion signal is inserted may be changed after each data transfer operation or after every certain number of data transfer operations. Note however that for data that is transferred immediately before and after a change in the insertion position, the advantageous effect of suppressing the number of switching transitions through the bit inversion of the transferred data is detracted from due to the change in the insertion position. Thus, for lower power consumption, it is preferred that the insertion position is changed with a low frequency, but for higher security, it is preferred that the insertion position is changed with a high frequency. In view of this, different modes may be provided with respect to the frequency with which the insertion position is changed, so that one of the modes can be selected depending on whether the power consumption or the security level is given a higher priority, for example.

Alternatively, the inversion determination section 11 may determine whether or not to bit-invert the scrambled data DT3, into which the inversion signal SI has already been inserted. In this way, even if the position at which the inversion signal SI is inserted is changed after each data transfer operation, it is possible to suppress the number of switching transitions and thus to reduce the power consumption. Note however that it is then necessary to provide the positional information SP, indicating the position at which the inversion signal SI is inserted, to the inversion determination section 11 from the first positional information determination section 16.

Note that the inversion signal is not limited to a 1-bit signal, but may alternatively be a multi-bit signal. For example, an input data signal may be divided into a plurality of signals, for each of which the Hamming distance is calculated, and each Hamming distance is compared with a predetermined inversion rate. Then, the comparison results may be concatenated together to obtain a single inversion signal. For example, a 32-bit data signal may be divided into two 16-bit data signals, for which of which it is determined whether the signal should be bit-inverted, thereby generating a 2-bit inversion signal. In such a case, the two bits of the inversion signal may be inserted together at a single position or separately at different positions.

Second Embodiment

The configuration of a data transfer system according to the second embodiment of the present invention is basically the same as that of the first embodiment illustrated in FIG. 1. The second embodiment is different from the first embodiment in that the encrypting section 18 generates the scrambled data DT3 while shuffling the bit positions of the intermediate data DT2.

Specifically, a scrambling section 17A of the present embodiment inserts the inversion signal SI in the intermediate data DT2 at a predetermined bit position based on the positional information SP from the first positional information determination section 16, and shuffles the bit positions of the intermediate data DT2, so as to generate and output the scrambled data DT3.

Figure 8:
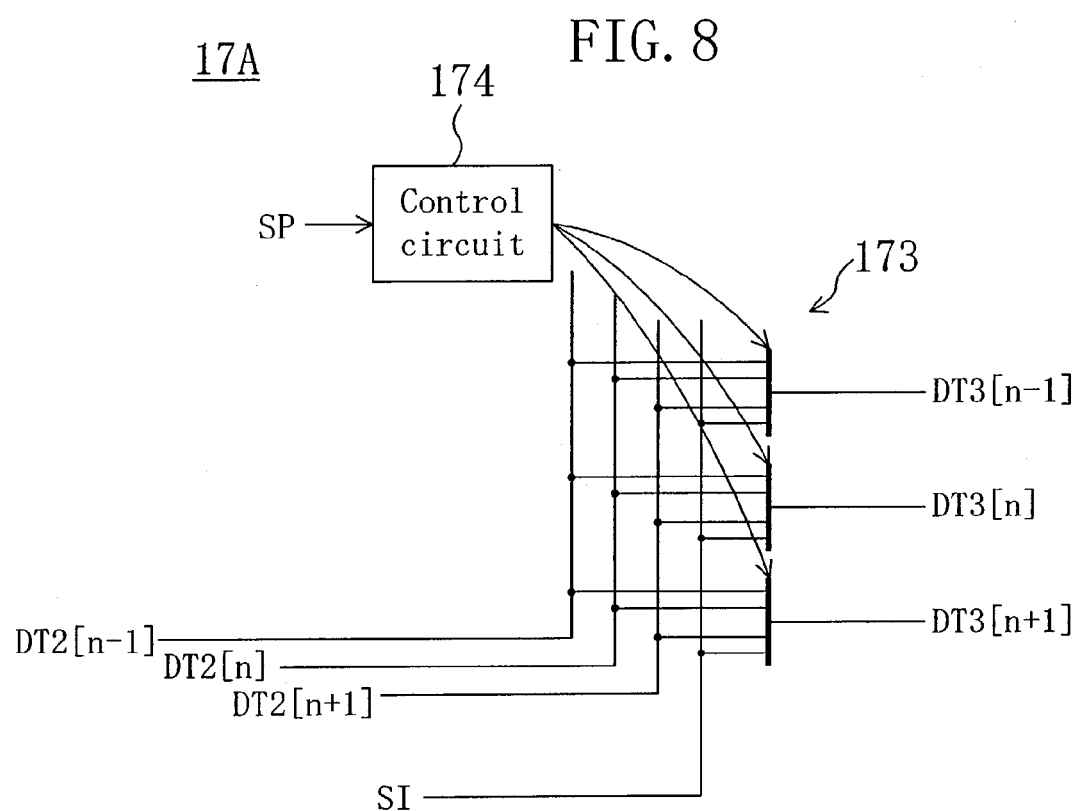
FIG. 8 is a diagram illustrating a configuration of a scrambling section in a data-sending device according to the second embodiment of the present invention.
Figure 9:
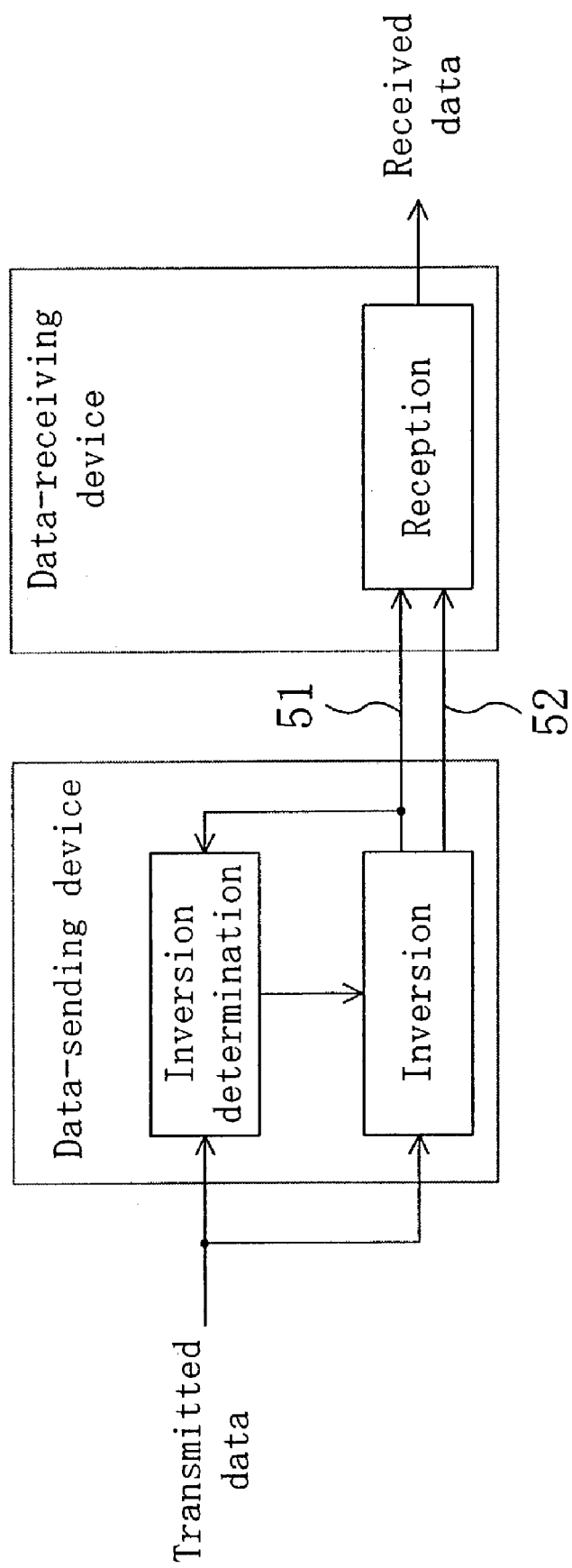
FIG. 9 is a block diagram illustrating a configuration of a conventional data transfer system.

FIG. 8 illustrates an internal configuration of the scrambling section 17A of the present embodiment. As illustrated in FIG. 8, the scrambling section 17A includes a number of selectors 173, and a control circuit 174 for controlling the operation of the selectors 173 based on the positional information SP. The number of selectors 173 is the bit width of the input data plus one (only three selectors 173 are shown in FIG. 8 for the sake of simplicity). Each selector 173 receives all bits of the intermediate data DT2 and the inversion signal SI, and selectively outputs one of these inputs as a bit value of the scrambled data DT3.

With the configuration of FIG. 8, any of all bits of the intermediate data DT2 and the inversion signal SI can be output as DT3 [n]. The control circuit 174 controls the selection operation of the selectors 173 when the positional information SP changes, whereby the bit positions of the intermediate data DT2 can be shuffled. For example, the $0^{th}$ bit of the scrambled data DT3, DT3 [0], may be the $0^{th}$ bit of the input data DT1, the $10^{th}$ bit of the input data DT1, the inversion signal SI, etc.

On the other hand, the data separation section 22 of the data-receiving device 20 removes the inversion signal SI from the scrambled data DT3 according to the positional information SPA provided from the second positional information determination section 21, and de-shuffles the remaining bit positions of the data, thereby restoring the input data DT1A.

By shuffling the bit positions of the transferred data while inserting the inversion signal, it is possible to further improve the security level from that in the first embodiment.

Note that the bit position shuffling may be performed after each data transfer operation or at a predetermined interval. In this way, even if the bit positions can be de-shuffled from outside, the arrangement of data bits changes over time, thereby making it more difficult to decrypt the transferred data from outside, and thus enhancing the security level.

Note however that if the bit position shuffling is performed with a high frequency, the security level is enhanced accordingly, but the advantageous effect of suppressing the number of switching transitions is detracted from, and the power consumption on the I/O pad increases. On the other hand, if the bit position shuffling is performed with a low frequency, the power consumption on the I/O pad is reduced, but the security level is lowered. In view of this, different modes may be provided with respect to the frequency with which the bit position shuffling is performed, so that one of the modes can be selected depending on whether the power consumption or the security level is given a higher priority, as in the first embodiment.

Alternatively, the inversion determination section 11 may determine whether or not to bit-invert the scrambled data DT3, whose bit positions have already been shuffled. In this way, even if the bit position shuffling is performed after each data transfer operation, it is possible to suppress the number of switching transitions and thus to reduce the power consumption. Note however that it is then necessary to provide the positional information SP, indicating how the bit positions have been shuffled, to the inversion determination section 11 from the first positional information determination section 16.

As described above, the present invention provides a data transfer system, in which the inversion signal is inserted in transferred data at a certain bit position, thereby enhancing the security level as compared with that in the prior art. Thus, it is possible to realize both an enhanced security level and a reduction in the power consumption at a low cost without using a complicated encryption circuit.

What is claimed is:

1. A data transfer system for transferring data between a data-sending device and a data-receiving device, wherein:
   the data-sending device includes:
      a data generation section for receiving input data so as to provide the input data itself or a bit-inverted version of the input data as intermediate data and generate an inversion signal that indicates whether or not the intermediate data is the bit-inverted version of the input data; and
      an encrypting section for receiving the intermediate data and the inversion signal so as to generate scrambled data by inserting the inversion signal in the intermediate data at a bit position which is variable;
   the data-sending device sends the scrambled data; and
   the data-receiving device includes a restoring section for obtaining the intermediate data by removing the inversion signal from the scrambled data so as to restore the input data based on the intermediate data and the inversion signal,
   wherein a frequency with which the bit position is changed is variable and is set according to a selected mode among different modes.

2. The data transfer system of claim 1, wherein: the encrypting section of the data-sending device includes a first pseudo-random number generator so that the bit position at which the inversion signal is to be inserted is determined according to the random number sequence generated by the first pseudo-random number generator; and
   the restoring section of the data-receiving device includes a second pseudo-random number generator capable of generating the same random number sequence as that generated by the first pseudo-random number generator so that a bit position from which the inversion signal is to be removed is determined according to the random number sequence generated by the second pseudo-random number generator.

3. The data transfer system of claim 1, wherein: the encrypting section of the data-sending device changes the bit position at which the inversion signal is to be inserted during a series of data transfer operations; and
   the restoring section of the data-receiving device changes a bit position from which the inversion signal is to be removed in synchronism with the encrypting section changing the bit position at which the inversion signal is to be inserted.

4. The data transfer system of claim 1, wherein the data generation section of the data-sending device obtains a Hamming distance between the received input data and intermediate data, which is to be transferred a time slot before the input data, so as to determine whether or not the input data is to be bit-inverted based on the Hamming distance.

5. The data transfer system of claim 1, wherein: the encrypting section of the data-sending device shuffles bit positions of the intermediate data when generating the scrambled data at a predetermined interval; and
   the restoring section of the data-receiving device obtains the intermediate data from the scrambled data by removing the inversion signal and de-shuffling the bit positions.

* * * * *